United States Patent
Naito

[11] Patent Number: 6,075,649
[45] Date of Patent: Jun. 13, 2000

[54] LENS FILM AND PLANAR LIGHT SOURCE APPARATUS

[75] Inventor: Nobuo Naito, Shinjuku-ku, Japan

[73] Assignee: Dai Nippon Printing Co., Ltd., Tokyo, Japan

[21] Appl. No.: 09/294,402

[22] Filed: Apr. 20, 1999

[30] Foreign Application Priority Data

Apr. 22, 1998 [JP] Japan .................................. 10-111773

[51] Int. Cl.$^7$ ............................... G02B 27/10; F21N 7/04

[52] U.S. Cl. .............................. 359/619; 362/31; 349/65; 349/61; 385/146

[58] Field of Search .................................. 359/619, 627, 359/487, 599; 362/31, 30; 349/61, 64, 65, 67; 385/31, 146

[56] References Cited

U.S. PATENT DOCUMENTS

| | | | |
|---|---|---|---|
| 5,581,605 | 12/1996 | Murakami et al. | 359/619 |
| 5,887,964 | 3/1999 | Higuchi et al. | 362/31 |
| 5,961,198 | 10/1999 | Hira et al. | 362/31 |
| 5,999,685 | 12/1999 | Goto et al. | 385/146 |

FOREIGN PATENT DOCUMENTS

| | | |
|---|---|---|
| 56-157310 | 12/1981 | Japan . |
| 61-156273 | 7/1986 | Japan . |
| 4-107201 | 4/1992 | Japan . |

*Primary Examiner*—Loha Ben
*Attorney, Agent, or Firm*—Oliff & Berridge, PLC.

[57] ABSTRACT

The cross section of the vertex parts 12B of unit lenses 12 of a lens film 10 suitable for use in a planar light source apparatus for a liquid-crystal panel are the shape of an arc, this arc having a radius in of at least 10 $\mu$m, but not greater than 25 $\mu$m.

20 Claims, 5 Drawing Sheets

LENS FILM AND PLANAR LIGHT SOURCE APPARATUS

BACKGROUND OF THE INVENTION

1. Field of the Invention

The present invention relates to a planar light source apparatus used in a liquid-crystal display apparatus or the like, and to a lens film that is suitable for used in such as planar light source apparatus.

2. Description of the Related Art

As shown in FIG. 7, for example, for edge lighting, a planar light source apparatus 2 in a transmission-type liquid-crystal display apparatus 1 of the past is formed by a light source lamp 3 and light-transmitting material that is approximately planar in form, this light source having a light guide 4, which receives incident light that is emitted from the light source lamp 3 at one edge surface 4A and emits this light from a light exiting surface 4B.

In the Japanese Unexamined Patent Application publication H4-107201, there is the disclosure of such a planar light source apparatus, this apparatus having a lens film 6 that has a plurality of unit lenses 6A that are arranged with a prescribed pitch in either one direction or directions in two dimensions, this being disposed on the light exiting surface 4B side of the above-noted light guide 4, with a light-diffusing sheet 5 between the lens film 6 and the light guide 4.

In the liquid-crystal panel 7 that is illuminated by the above-noted planar light source apparatus 2 is configured so that the two surfaces of the liquid-crystal cell 7 are held between the polarizers 9A and 9B. The reference numeral 8 in FIG. 7 denotes a reflective sheet for the purpose of reflecting light that exits from the rear surface of the light guide 4 so that the light is returned to the light guide 4, and 4D denotes a light-scattering element.

The lens film 6 is usually positioned so that the ends of the unit lenses 6A of the lens film 6 make physical contact with the polarizer 9B or make contact with the light exiting surface 4B of the light guide 4.

However, because the ends of the above-noted unit lenses are usually pointed, with an angle in the area of 90°, there is the problem of a susceptibility to damage to the polarizer 9B or light exiting surface 4B of the light guide 4 with which they come in contact. In the case in which two lens films are overlaid in the same direction, there is a tendency for damage to occur in the flat part.

If the unit lenses 6A are made of a soft material, so as to avoid damaging the polarizer 9B or the light exiting surface 4B of the light guide 4, there is a tendency for them to deform by the action of the contact force, thereby leading to the new problem of it being impossible to maintain the performance of the lenses.

If the pitch of the unit lenses 6A is made large, there is a reduction in the number of unit lenses that make contact with the polarizer 9B or the light exiting surface 4B, this causing an increase in the load that each unit lens 6A bears, leading to a tendency of the polarizer 9B or light exiting surface 4B being damaged by stress concentrations. In contrast to this, if the shape of the past is used, there is the problem of a tendency for the lenses themselves to be damaged.

SUMMARY OF THE INVENTION

Accordingly, it is an object of the present invention, in consideration of the above-described drawbacks in the prior art, to provide a lens film such that, even if another optical sheet or optical film comes into contact with the ends of the unit lenses, there is no damage to them from the ends of the unit lenses.

It is another object of the present invention to provide a planar light source apparatus that uses the above-noted lens film.

One form of a lens film according to the present invention that achieves the above-noted object is a lens film that has a plurality of unit lenses arranged on one surface of a transparent substrate sheet with a pitch of 30 to 70 $\mu$m in the direction of one dimension or in the direction of two dimensions, the vertices of the unit lenses making contact with the surface of another optical sheet, the cross-section of the end parts of the unit lenses in a direction that intersects the above-noted one surface of the above-noted transparent substrate sheet being an arc shape with a radius that is at least 10 $\mu$m and no greater than 25 $\mu$m.

Another form of a lens film according to the present invention that achieves the above-noted object is a lens film disposed so as to be parallel to a light exiting surface a light source that emits light from the planar light exiting surface wherein said lens film comprising, on a surface of a transparent sheet that is opposite or at the side of said light source, a plurality of unit lenses arranged with a pitch of 30 to 70 $\mu$m in the direction of one dimension or in the direction of two dimensions, the vertices of said unit lenses making contact with a surface of another optical sheet, the cross-section of the end parts of said unit lenses in a direction that intersects said surface of said transparent substrate sheet being an arc shape with a radius that is at least 10 $\mu$m and no greater than 25 $\mu$m.

At least the vertices of the above-noted unit lenses are made of a material that has a minimum Shore hardness in the range from 70 to 90.

It is also possible to make the vertex angle of the unit lenses in the range from 30° to 120°.

One form of a planar light source according to the present invention that achieves the above-noted object is one that has a light source that emits a light source light from a light emitting surface that is planar, and a lens film such as described above, this lens film being disposed on the light exiting side of the light source and parallel thereto.

In the present invention, the unit lenses are formed at an optimum pitch and also have vertices that are arc-shaped and have a radius such that they do not reduce the surface intensity and do not become deformed when they come into contact with another optical sheet.

DESCRIPTION OF THE PREFERRED EMBODIMENTS

Embodiments of the present invention are described below in detail, with reference being made to the relevant accompanying drawings.

Figure 1:
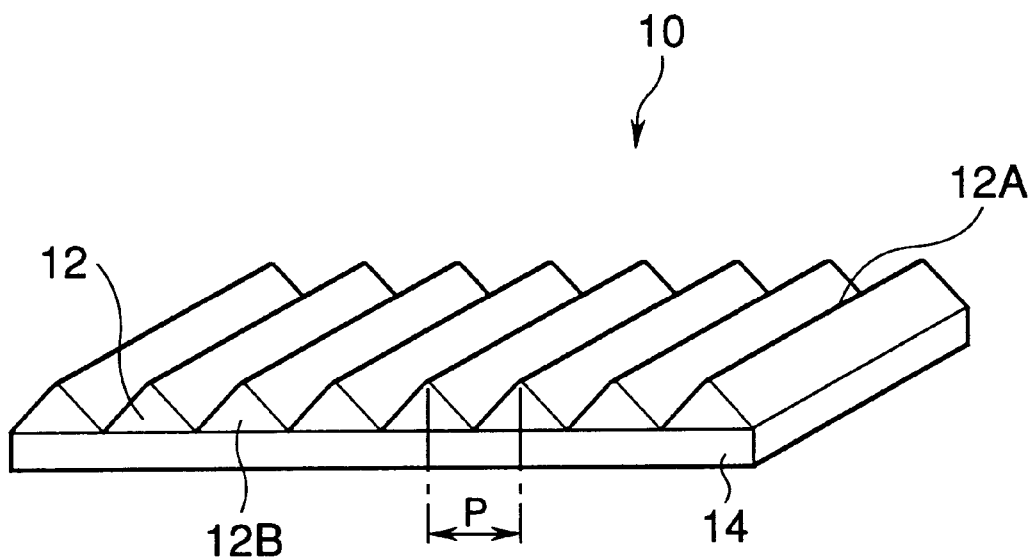
FIG. 1 is an enlarged perspective view that shows a part of an embodiment of a lens film according to the present invention.
Figure 2:
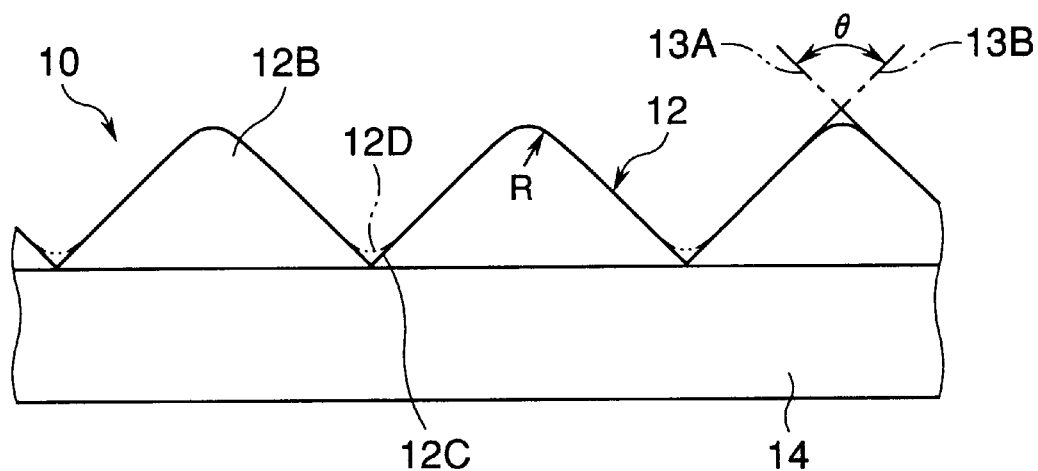
FIG. 2 is an enlarged cross-sectional view that shows an embodiment of a lens film according to the present invention.

FIG. 1 shows a schematic representation of part of a lens film 10, which is an embodiment of the present invention, in which unit lenses 12, which are made of a transparent substance and which are in the approximate shape of a triangular prism, are arranged onto one surface of a transparent substrate sheet 14 so that the edges 12A thereof are mutually parallel, and so that the pitch between the unit lenses is in the range from 30 to 70 μm, the cross-section of the vertex part 12B of the unit lens 12 that intersects with the above-noted one surface of the transparent substrate sheet 14 being, in FIG. 1 and FIG. 2, convex pointing upward, the radius R of the arc thereof being at least 10 μm and no greater than 25 μm.

The lens film 10 is obtained either by forming the unit lenses 12 directly onto the transparent substrate film 14, or by forming these as separate elements.

Methods of forming the lens shape include a known hot-pressing method (refer to Japanese Unexamined Patent Application publication S56-157310), and the method of using a roll embossing plate to emboss a thermoplastic resin film that is curable using ultraviolet light, after which ultraviolet light is irradiated onto the film to harden it (refer to Japanese Unexamined Patent Application publication S61-156273).

Materials for the above-noted transparent substrate sheet 14 and the unit lenses 12 are light-transmitting materials in flat or sheet form, this material being a resin, for example an acrylic resin such as polymethyl methacrylate (PMMA) or polymethyl acrylate (PMA), a homopolymer or copolymer of an ester methacrylate, a polyester of polyethylene terephthalate, polycarbonate, or polyethylene, or a transparent glass or ceramic.

After curing the resin used to form the unit lenses 12, the material is given a Shore hardness D of 70 to 90.

The reason that the pitch P of the unit lenses is made 30 μm or greater is that, if the pitch is made smaller than this in a lens film 10 used in a planar light source apparatus for a liquid-crystal display apparatus, there is a reduction in the intensity in the liquid-crystal cell and, if the pitch exceeds 70 μm, Moire fringes will occur because of overlapping of this pitch with the pixel pitch in the liquid-crystal cell.

The reason that the radius R of the arc in the cross section of the vertex part 12B of the unit lenses 12 is established as described above is that, if this radius R is less than 10 μm, there is a tendency for another optical sheet, for example a polarizer, that comes into contact with the vertex parts 12B of the unit lenses 12 to become damaged and, in particular, because there is a tendency for deformation to occur when the contact force exceeds a certain force.

The reason that the radius R was made smaller than 25 μm was that, if the radius R exceeds 25 μm, there is an excessive reduction in the light intensity at the surface of the liquid-crystal display apparatus.

The reason the Shore hardness of the vertex parts 12B of the unit lenses was made in the range from 70 to 90 was that this is the range of the Shore hardness of elements such as a polarizer or light guide with which the unit lenses come into contact, thereby minimizing damage caused upon such contact by a difference in hardnesses.

In the cross section of the unit lenses 12 in the above-noted lens film 10, the vertex part 12B is in the shape of an arc and the base part is in the shape of a straight line, so that a V-shape base part 12C is formed between neighboring unit lenses 12. The present invention does not, however, impose any limitation in this regard, and it is also possible for a base part 12D to be formed as an arc, as shown by the double-dot broken line shown in FIG. 2.

The angle of intersection (vertex angle) between the tangent lines 13A and 13B at the two sides of the vertex parts 12B of the unit lenses 12 is 85°. However, there is no particular restriction imposed with regard to this vertex angle, it preferably being in the range from 30° to 120° and more preferably being in the range from 40° to 90°.

An embodiment of a planar light source apparatus that make use of the above-described lens film is described below.

Figure 3:
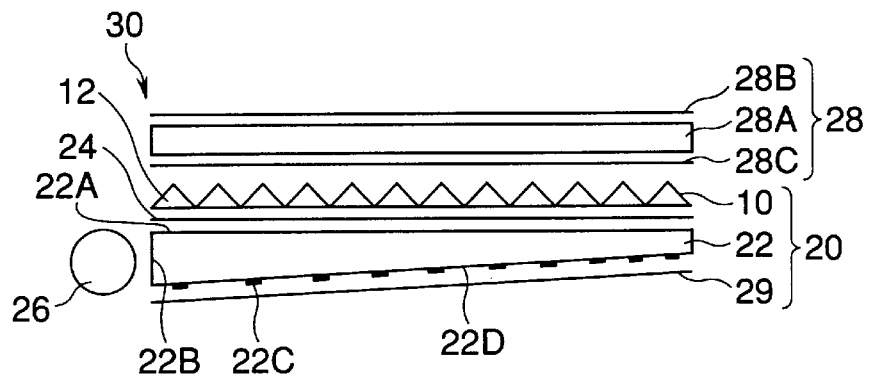
FIG. 3 is a simplified side view that shows a planar light source apparatus into which is built the above-noted lens film, and a liquid-crystal panel that is illuminated by this planar light source apparatus.

This planar light source apparatus 20, as shown in FIG. 3, has a light guide 22 that has a planar light exiting surface 22A, the lens film 10 on the light exiting surface 22A of the light guide 10, with the surface thereof that is opposite the surface with the unit lenses 12 facing and parallel to the light exiting surface 22A, a light-diffusing sheet 24 that is interposed between the lens film 10 and the light exiting surface 22A, and a light source lamp 26 that causes light to enter the light guide 22 by striking it at one edge surface 22A, light that is incident to the light guide 22 at the edge surface 22A being output in the direction of the lens film 10 and illuminates a liquid-crystal panel as shown in FIG. 3, for example, that is disposed above the lens film 10, the combination thereof forming a liquid-crystal display apparatus 30.

In FIG. 3, the reference numeral 22C denotes a light-scattering element that is provided on the rear surface (lower surface in the drawing) which is on the opposite side of the light guide 22 from the light exiting surface 22A, and 29 denotes a reflective sheet that is disposed below the light guide 22 as shown in FIG. 3, this being provided for the purpose of reflecting light that is emitting downward from light guide 22, so as to return this light to the light guide 22.

The liquid-crystal panel 28 is formed by a liquid-crystal cell 28A, the two surfaces of which are held between polarizers 28B and 28C. The lens film 10 is disposed so the vertex parts 12B of the unit lenses 12 thereof make physical contact with the lower polarizer 28C.

In this planar light source apparatus 20, because the vertex parts 12B of the unit lenses 12 of the lens film 10, as described above, are formed as arcs having a prescribed radius, even if the vertex parts 12B come into physical contact with the polarizer 28C of the liquid-crystal panel 28, there is no damage to the polarizer 28C, nor are the lenses themselves damaged.

As described above, because the pitch between the unit lenses 12 of the lens film 10 is established in the range from 30 μm to 70 μm, there is no reduction in light intensity observed at the liquid-crystal panel 28, nor are there Moire fringes occurring in the display.

Additionally, because the vertex parts 12B of the unit lenses 12 have a Shore hardness as described above, there is little damage occurring to one of the contacting elements because of a difference in hardness of vertex parts 12B and the polarizer 28C, nor is there damage to the lenses themselves.

Figure 4:
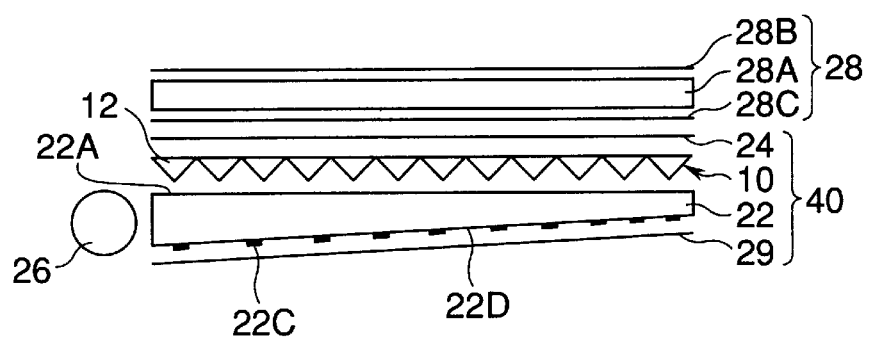
FIG. 4 is a simplified side view similar to FIG. 3, with a different combination of this planar light source apparatus.
Figure 5:
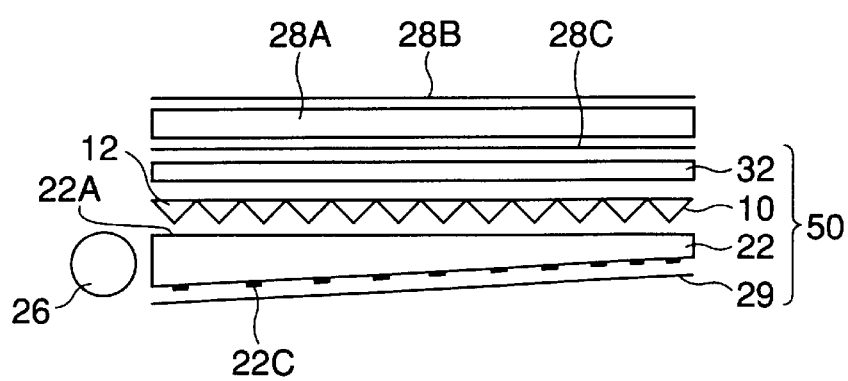
FIG. 5 is a simplified side view similar to FIG. 2, with a planar light source apparatus of yet a different configuration.

While the planar light source apparatus 20 shown in FIG. 3 shows the unit lenses 12 of the lens film 10 facing the liquid-crystal panel 28, the present invention does not present this as a restriction, and it is possible, as shown by way of the planar light source apparatuses 40 and 50 in FIG. 4 and FIG. 5, to have the unit lenses 12 face and make physical contact with the light exiting surface 22A of the light guide 22.

Additionally, in place of light-diffusing sheet 24 that is used in the planar light source apparatuses shown in FIG. 3 and FIG. 4, it is possible, as shown in the planar light source apparatus 50 that is shown in FIG. 5, to place a second lens film 32 between the lens film 10 and the liquid-crystal panel 28. In this case, it is preferable that the lens film 32 be oriented so that the edge lines of its unit lenses intersect with the edge lines of the unit lenses 12 of the lens film 10.

Figure 6:
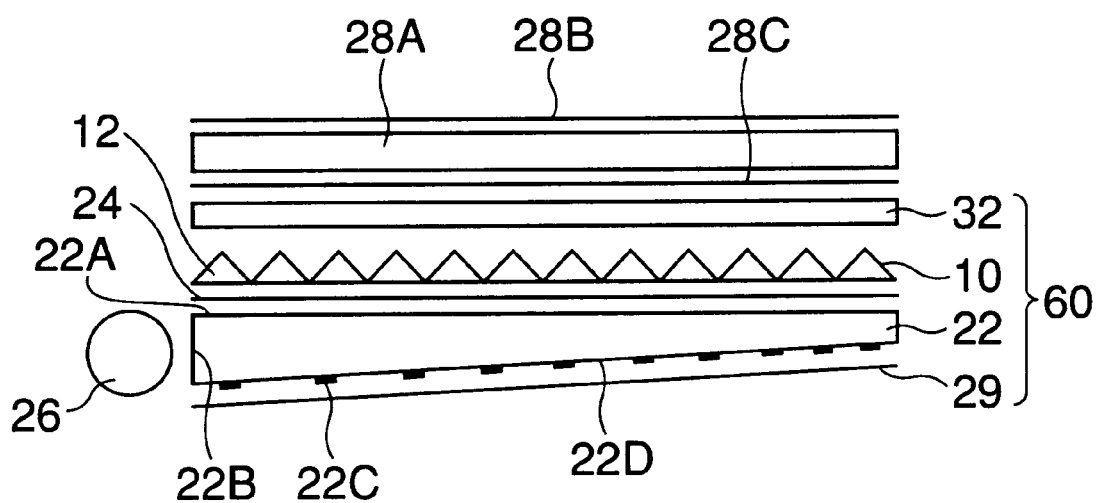
FIG. 6 is a simplified side view similar to FIG. 5, with a planar light source apparatus of still a different configuration.
Figure 7:
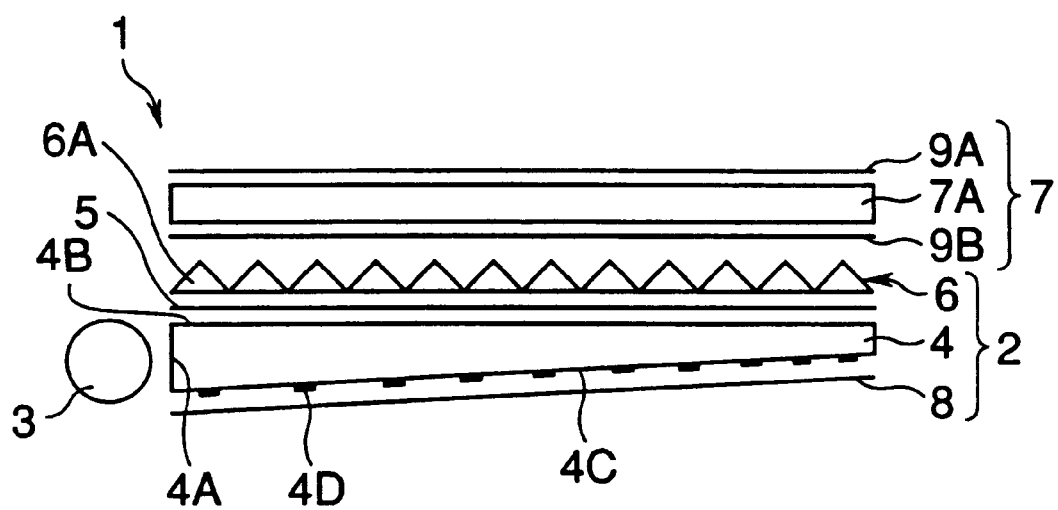
FIG. 7 is a simplified side view that shows a liquid-crystal display apparatus of the prior art.

Additionally, it is possible to adopt a configuration in which, as shown by the planar light source apparatus 60 in FIG. 6, the lens film 10 in FIG. 5 is oriented so that the unit lenses 12 thereof face toward the liquid-crystal panel 28. In this case, a light-diffusing sheet 24 is disposed between the lens film 10 and the light exiting surface 22A of the light guide 22.

Table 1 through Table 7 show the results of measurements performed to observe the normal-direction intensity, the angle of half-value light intensity, and the immunity to damage using a planar light source apparatus such as shown in FIG. 3 to illuminate a liquid-crystal panel, in which light source apparatus the light-diffusing surface of a light-diffusing film (Dai Nippon Printing Co. No. 7900SC) is overlaid onto the unit lens side surface of a lens film as described above, with various unit lens pitch values P and radii R of the vertex part arc, a weight of 10 grams being rested thereonto (with a contact surface area of 1 cm$^2$), the light-diffusing film being then slid at a speed of 10 cm/second.

For the measurement of the optical characteristics of the liquid-crystal panel, the size of the light guide was 12.1 inches, the light intensity meter used was a Topcon model BM-7 (with a measuring angle of 0.2°), and the measurement position was 50 cm from the front surface of the liquid-crystal panel.

TABLE 1

P = 30 μm

| Lens vertex part radius R (μm) | Normal-direction light intensity (cd/m$^2$) | Half-value width (θ°) | Immunity to Damage |
|---|---|---|---|
| 0 | 1121 | 68 | Poor |
| 5 | 1090 | 70 | Poor |
| 7 | 1063 | 70 | Fair |
| 10 | 1026 | 71 | Good |
| 15 | 950 | 73 | Good |
| 20 | 903 | 74 | Good |
| 25 | 887 | 75 | Good |

TABLE 2

P = 35 μm

| Lens vertex part radius R (μm) | Normal-direction light intensity (cd/m$^2$) | Half-value width (θ°) | Immunity to Damage |
|---|---|---|---|
| 0 | 1123 | 68 | Poor |
| 5 | 1090 | 70 | Poor |
| 7 | 1062 | 70 | Fair |
| 10 | 1040 | 71 | Good |
| 15 | 971 | 73 | Good |
| 20 | 937 | 74 | Good |
| 25 | 899 | 75 | Good |

TABLE 3

P = 40 μm

| Lens vertex part radius R (μm) | Normal-direction light intensity (cd/m$^2$) | Half-value width (θ°) | Immunity to Damage |
|---|---|---|---|
| 0 | 1130 | 67 | Poor |
| 5 | 1195 | 69 | Poor |
| 7 | 1070 | 69 | Fair |
| 10 | 1060 | 70 | Good |
| 15 | 991 | 71 | Good |
| 20 | 951 | 72 | Good |
| 25 | 913 | 74 | Good |

TABLE 4

P = 45 μm

| Lens vertex part radius R (μm) | Normal-direction light intensity (cd/m$^2$) | Half-value width (θ°) | Immunity to Damage |
|---|---|---|---|
| 0 | 1131 | 67 | Poor |
| 5 | 1108 | 69 | Poor |
| 7 | 1095 | 69 | Fair |
| 10 | 1084 | 70 | Good |
| 15 | 1023 | 72 | Good |
| 20 | 981 | 72 | Good |
| 25 | 919 | 74 | Good |

TABLE 5

P = 50 μm

| Lens vertex part radius R (μm) | Normal-direction light intensity (cd/m$^2$) | Half-value width (θ°) | Immunity to Damage |
|---|---|---|---|
| 0 | 1130 | 66 | Poor |
| 5 | 1110 | 70 | Poor |
| 7 | 1102 | 71 | Fair |
| 10 | 1089 | 72 | Good |
| 15 | 1042 | 73 | Good |
| 20 | 985 | 73 | Good |
| 25 | 930 | 75 | Good |

TABLE 6

P = 60 μm

| Lens vertex part radius R (μm) | Normal-direction light intensity (cd/m²) | Half-value width (θ°) | Immunity to Damage |
|---|---|---|---|
| 0 | 1133 | 66 | Poor |
| 5 | 1115 | 70 | Poor |
| 7 | 1105 | 71 | Fair |
| 10 | 1091 | 72 | Good |
| 15 | 1052 | 73 | Good |
| 20 | 991 | 74 | Good |
| 25 | 954 | 76 | Good |
| 30 | 938 | 76 | Good |

TABLE 7

P = 70 μm

| Lens vertex part radius R (μm) | Normal-direction light intensity (cd/m²) | Half-value width (θ°) | Immunity to Damage |
|---|---|---|---|
| 0 | 1135 | 66 | Poor |
| 5 | 1117 | 70 | Poor |
| 7 | 1109 | 71 | Fair |
| 10 | 1097 | 72 | Good |
| 15 | 1067 | 73 | Good |
| 20 | 1002 | 74 | Good |
| 25 | 965 | 76 | Good |

In the above tables, "poor" indicates that damage was incurred and that the lens film surface is whitened, "fair" indicates that some damage is incurred, and "good" indicates that no damage occurs.

By adopting the configuration as described above, in the present invention even if the vertex parts of the unit lenses of the lens film come into contact with another optical sheet, there is no damage to the optical sheet and, as built into a planar light source apparatus for use in illuminating a liquid-crystal panel, there is no reduction of the intensity of the liquid-crystal panel, nor do Moire fringes occur. In addition, there is no drop in intensity at the surface of the liquid-crystal panel.

What is claimed is:

1. A lens film comprising a plurality of unit lenses arranged on one surface of a transparent substrate sheet with a pitch of 30 to 70 μm in the direction of one dimension or in the direction of two dimensions, the vertices of said unit lenses making contact with a surface of another optical sheet, the cross-section of the end parts of said unit lenses in a direction that intersects said surface of said transparent substrate sheet being an arc shape with a radius that is at least 10 μm and no greater than 25 μm.

2. A lens film according to claim 1, wherein the Shore hardness of at least the ends of said unit lenses is in the range from 70 to 90.

3. A lens film according to claim 2, wherein the vertex angle of said unit lenses is in the range from 30° to 120°.

4. A lens film according to claim 1, wherein the vertex angle of said unit lenses is in the range from 30° to 120°.

5. A lens film disposed so as to be parallel to a planar light exiting surface of a light source that emits light from the planar light exiting surface wherein said lens film comprising, on a surface of a transparent substrate sheet that is opposite said light source, a plurality of unit lenses arranged with a pitch of 30 to 70 μm in the direction of one dimension or in the direction of two dimensions, the vertices of said unit lenses making contact with a surface of another optical sheet, the cross-section of the end parts of said unit lenses in a direction that intersects said surface of said transparent substrate sheet being an arc shape with a radius that is at least 10 μm and no greater than 25 μm.

6. A lens film according to claim 5, wherein the Shore hardness of at least the ends of said unit lenses is in the range from 70 to 90.

7. A lens film according to claim 6, wherein the vertex angle of said unit lenses is in the range from 30° to 120°.

8. A lens film according to claim 5, wherein the vertex angle of said unit lenses is in the range from 30° to 120°.

9. A lens film disposed so as to be parallel to a planar light exiting surface of a light source that emits light from the planar light exiting surface wherein said lens film comprising, on a surface of a transparent substrate sheet that is at the side of said light source, a plurality of unit lenses arranged with a pitch of 30 to 70 μm in the direction of one dimension or in the direction of two dimensions, the vertices of said unit lenses making contact with a surface of another optical sheet, the cross-section of the end parts of said unit lenses in a direction that intersects said surface of said transparent substrate sheet being an arc shape with a radius that is at least 10 μm and no greater than 25 μm.

10. A lens film according to claim 9, wherein the Shore hardness of at least the ends of said unit lenses is in the range from 70 to 90.

11. A lens film according to claim 10, wherein the vertex angle of said unit lenses is in the range from 30° to 120°.

12. A lens film according to claim 9, wherein the vertex angle of said unit lenses is in the range from 30° to 120°.

13. A planar light source apparatus comprising a light source that emits light from a planar light exiting surface and a lens film that is disposed so as to be parallel to said light exiting surface, said lens film comprising, on a surf ace of a transparent substrate sheet that is opposite said light source, a plurality of unit lenses arranged with a pitch of 30 to 70 μm in the direction of one dimension or in the direction of two dimensions, the vertices of said unit lenses making contact with a surface of another optical sheet, the cross-section of the end parts of said unit lenses in a direction that intersects said surface of said transparent substrate sheet being an arc shape with a radius that is at least 10 μm and no greater than 25 μm.

14. A planar light source apparatus according to claim 13, wherein the Shore hardness of at least the ends of said unit lenses is in the range from 70 to 90.

15. A planar light source apparatus according to claim 14, wherein the vertex angle of said unit lenses is in the range from 30° to 120°.

16. A planar light source apparatus according to claim 13, wherein the vertex angle of said unit lenses is in the range from 30° to 120°.

17. A planar light source apparatus comprising a light source that emits light from a planar light exiting surface and a lens film that is disposed so as to be parallel to said light exiting surface, said lens film comprising, on a surface of a transparent substrate sheet that is at the side of said light source, a plurality of unit lenses arranged with a pitch of 30 to 70 μm in the direction of one dimension or in the direction of two dimensions, the vertices of said unit lenses making contact with a surface of another optical sheet, the cross-section of the end parts of said unit lenses in a direction that intersects said surface of said transparent substrate sheet being an arc shape with a radius that is at least 10 µm and no greater than 25 µm.

18. A planar light source apparatus according to claim 17, wherein the Shore hardness of at least the ends of said unit lenses is in the range from 70 to 90.

19. A planar light source apparatus according to claim 18, wherein the vertex angle of said unit lenses is in the range from 30° to 120°.

20. A planar light source apparatus according to claim 17, wherein the vertex angle of said unit lenses is in the range from 30° to 120°.

* * * * *